US011824992B2

(12) United States Patent
Bahety

(10) Patent No.: US 11,824,992 B2
(45) Date of Patent: *Nov. 21, 2023

(54) SECURE TOKEN REFRESH

(71) Applicant: eBay Inc., San Jose, CA (US)

(72) Inventor: Anand Baldeodas Bahety, San Jose, CA (US)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/895,305

(22) Filed: Aug. 25, 2022

(65) Prior Publication Data

US 2022/0407713 A1 Dec. 22, 2022

Related U.S. Application Data

(63) Continuation of application No. 16/818,312, filed on Mar. 13, 2020, now Pat. No. 11,463,258.

(51) Int. Cl.
H04L 9/32 (2006.01)
H04L 9/30 (2006.01)
H04L 9/40 (2022.01)

(52) U.S. Cl.
CPC .......... *H04L 9/3234* (2013.01); *H04L 9/3073* (2013.01); *H04L 9/3213* (2013.01);
(Continued)

(58) Field of Classification Search
CPC ... H04L 9/3234; H04L 9/3073; H04L 9/3213; H04L 9/3247; H04L 63/08; H04L 63/083;
(Continued)

(56) References Cited

U.S. PATENT DOCUMENTS 10,637,665 B1 * 4/2020 Sundaresan ........... H04L 63/083
10,785,204 B2 9/2020 Yamanakajima et al.
(Continued)

FOREIGN PATENT DOCUMENTS

EP 3618387 A1 * 4/2020 ............. H04L 29/06
FI 129916 B * 10/2022 ............. H04W 12/084
(Continued)

OTHER PUBLICATIONS

Tech Blog, Retrieved from the Internet URL :<https://tech.ebayinc.com/>, Accessed on May 7, 2020, 8 pages.
(Continued)

*Primary Examiner* — Christopher A Revak
(74) *Attorney, Agent, or Firm* — SHOOK, HARDY & BACON L.L.P.

(57) ABSTRACT

Technologies are shown for secure token refresh where a client receives a first access token from an authentication service, generates an asymmetric key pair, stores the first access token in association with a private key, and sends a public key to the authentication service. The service stores the public key in association with the first access token. The client sends a refresh token request to the service with the first access token. The service responds with a verification request with proof data. The client signs the proof data with the private key and sends the signed proof data to the service. The service verifies the signed proof data using the public key associated with the first access token, creates a second access token that is stored in association with the public key, and sends the second access token to the client, which stores it in association with the private key.

20 Claims, 10 Drawing Sheets

(52) U.S. Cl.
    CPC ............ *H04L 9/3247* (2013.01); *H04L 63/08* (2013.01); *H04L 63/083* (2013.01)

(58) Field of Classification Search
    CPC ............... H04L 9/0891; H04L 63/0807; H04L 63/0846
    See application file for complete search history.

(56) References Cited

U.S. PATENT DOCUMENTS

| | | | |
|---|---|---|---|
| 11,334,661 B1* | 5/2022 | Brandwine | ........... H04W 12/04 |
| 11,463,258 B2* | 10/2022 | Bahety | ................ H04L 63/0807 |
| 2016/0328692 A1 | 11/2016 | Camps et al. | |
| 2017/0141926 A1* | 5/2017 | Xu | ...................... H04L 63/0209 |
| 2017/0195457 A1* | 7/2017 | Smith, II | ................ H04L 63/10 |
| 2018/0278603 A1 | 9/2018 | Yabe | |
| 2019/0081943 A1 | 3/2019 | Yamanakajima et al. | |
| 2019/0372958 A1 | 12/2019 | Dunjic et al. | |
| 2019/0372993 A1 | 12/2019 | Dunjic et al. | |
| 2020/0090135 A1* | 3/2020 | Malcangio | .......... H04W 12/084 |
| 2020/0092101 A1 | 3/2020 | Ajitomi et al. | |
| 2020/0336494 A1 | 10/2020 | Kitagata | |
| 2021/0058242 A1 | 2/2021 | Donsomsakunkij et al. | |
| 2021/0288808 A1 | 9/2021 | Bahety | |
| 2022/0353254 A1* | 11/2022 | Yocom | ................ H04W 12/084 |
| 2023/0042508 A1* | 2/2023 | Agarwal | ............... H04L 9/3247 |
| 2023/0120160 A1* | 4/2023 | Oh | ...................... H04L 63/0815 726/5 |

FOREIGN PATENT DOCUMENTS

| | | | | |
|---|---|---|---|---|
| WO | 2018/223125 A1 | 12/2018 | | |
| WO | WO 2021/198850 A1 * | 10/2021 | ............. | H04L 29/06 |

OTHER PUBLICATIONS

Hardt,"The OAuth 2.0 Authorization Framework", Internet Engineering Task Force, ISSN: 2070-1721, Oct. 2012, pp. 1-76.

Jones et al., "OAuth 2.0 Token Exchange", OAuth Working Group, Retrieved from Internet URL:https://tools.ietf.org/html/draft-ietf-oauth-token-exchange-16, Oct. 19, 2018, 1-34 pages.

Solapurkar,"Building Secure Healthcare Services Using OAuth 2.0 and JSON Web Token in IOT Cloud Scenario", @2016 IEEE, 2016, pp. 99-104.

\* cited by examiner

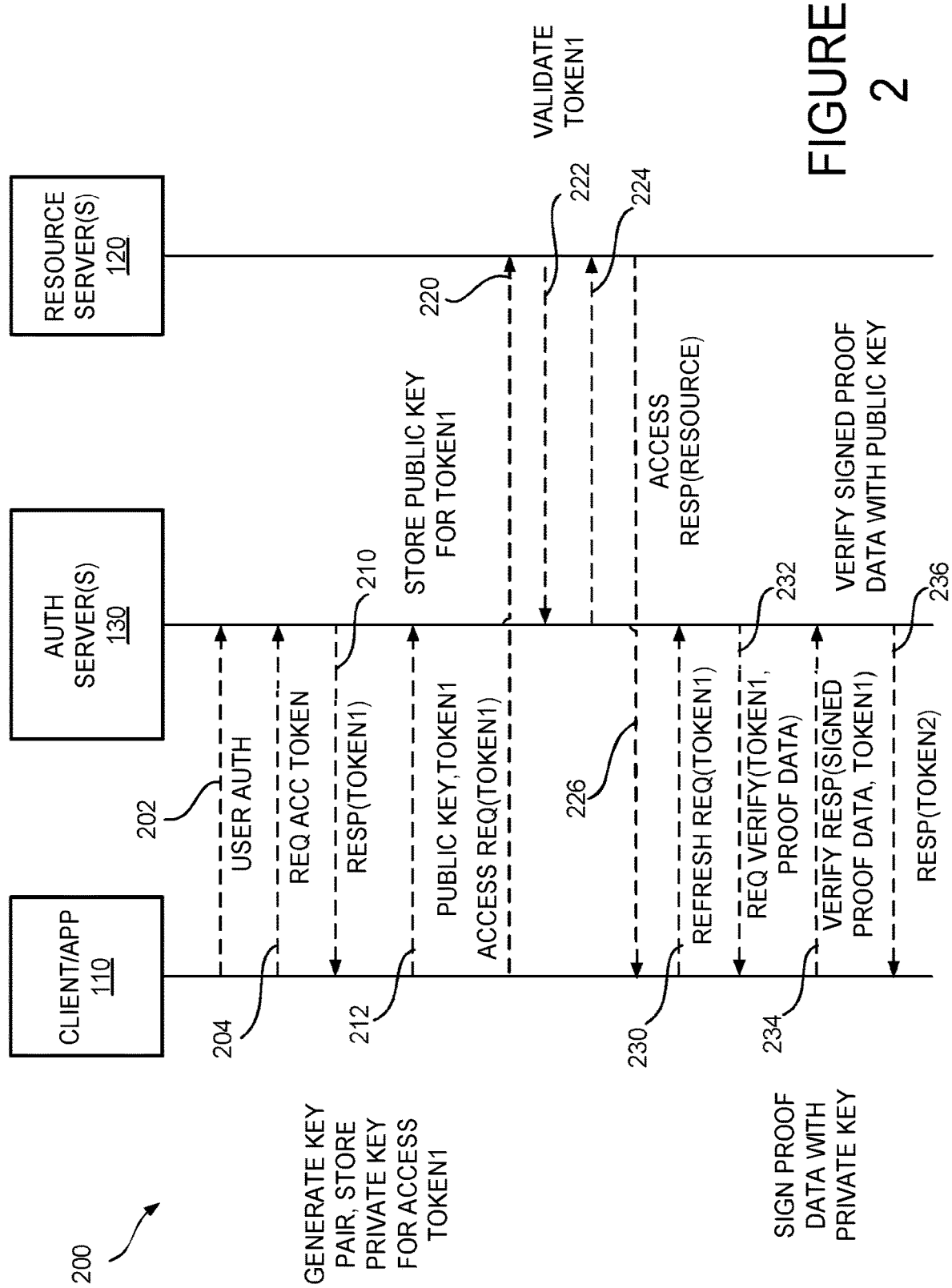

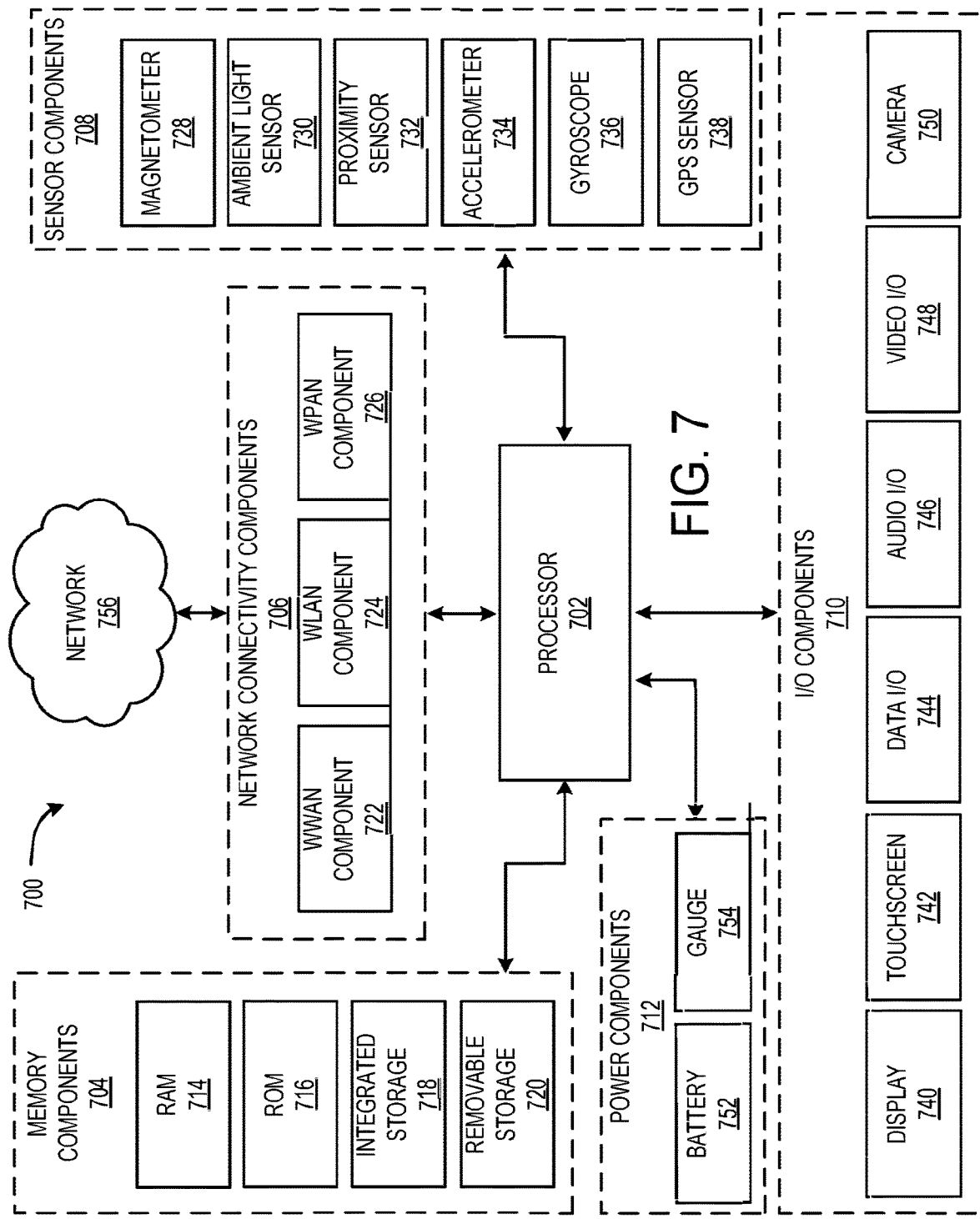

SECURE TOKEN REFRESH

CROSS-REFERENCE TO RELATED APPLICATIONS

This patent application is a continuation of U.S. patent application Ser. No. 16/818,312, filed Mar. 13, 2020, which is herein incorporated by reference in its entirety for all purposes.

BACKGROUND

Currently, the OAuth 2.0 standard provides a way for a user to authorize applications to access resources hosted by a resource server without having to share his/her credentials with the application. Applications request a security token called an access token from authorization server (AS) after a user's authentication and consent. However, this access token is valid for a limited time.

In order to avoid having to repeatedly ask for user consent, the OAuth 2.0 standard supports the concept of a refresh token, which can be used to refresh an access token. Refresh tokens, however, can be susceptible to man in the middle attack as they are often sent over open communication channels to the authorization server. Also, they are typically stored on the server side for validation, acting as a shared secret and are therefore prone to server-side data compromise.

It is with respect to these and other considerations that the disclosure made herein is presented.

SUMMARY

In certain simplified examples of the disclosed technologies, methods, systems, or computer readable media for secure token refresh involve an authentication service receiving a first message from a client with a first access token request and, in response, sending a message that includes a first access token to the client, receiving a second message that includes the first access token and a public key value, and in response to receiving the second message, storing the public key value in association with the first access token.

Certain examples also involve receiving a third message from the client with a refresh token request and the first access token and, in response, sending a reply message with a verification request to the client that includes first proof data. The authentication service receives a fourth message from the client with first signed proof data, where the first signed proof data was generated by the client signing the first proof data using a private key corresponding to the public key and the first access token. In response, the authentication service verifies the first signed proof data with the public key stored in association with the first access token, generates a second access token, stores the second access token in association with the public key, and sends a fifth message to the client with the second access token.

In particular examples, the authorization service periodically sends verification requests to the client with new proof data to maintain continuous authentication or perform trusted device management. In other specific examples, the authorization service sends verification requests to the client with new proof data based on one or more risk management criteria. In still other examples, the authorization service determines the proof data on the basis of a content or type of transaction relating to the first access token request.

In specific examples, the authentication service is an OAuth protocol authentication service and the secure token refresh method is an extension of the OAuth 2.0 protocol.

In further examples, the authentication service determines that a verification is to be performed, sends a sixth message to the client with a verification request that includes the first access token and second proof data. The authentication service receives a seventh message from the client with second signed proof data, where the second signed proof data was generated by the client signing the second proof data using the private key corresponding to the public key and the first access token. In response, the authentication service verifies the second signed proof data with the public key stored in association with the first access token. If the verification of the second signed proof data fails, then the authentication service can generate a verification failure alert or report or revoke authorization of the first access token.

Other simplified examples of the disclosed technologies, methods, systems, or computer readable media for secure token refresh involve, in a client, sending a message from the client to an authentication service that includes a first access token request. The authentication service receives the message with the first access token request and, in response, sends a message that includes a first access token to the client. The client receives the message that includes the first access token and, in response, generates a key pair having a private key and a public key, stores the private key in association with the first access token, and sends a message to the authentication service with the public key and the first access token. The authentication service receives the message that includes the first access token and the public key value and, in response, stores the public key value in association with the first access token.

In examples in accordance with certain aspects of the disclosed technology, the client sends a message to the authentication service with a refresh token request and the first access token. The authentication service receives the message from the client with the refresh token request and the first access token and, in response, sends a message with a verification request to the client that includes proof data.

The client receives the message with the verification request from the authentication service and, in response, signs the proof data with the private key stored in association with the first access token and sends a message to the authentication service with the signed proof data and the first access token.

The authentication service receives the message from the client with the signed proof data and the first access token and, in response, verifies the signed proof data with the public key stored in association with the first access token, generates a second access token, stores the second access token in association with the public key, and sends a message to the client with the second access token.

The client receives the message with the second access token and, in response, stores the second access token in association with the private key.

Certain examples involve periodically sending verification requests to the client with new proof data to maintain continuous authentication or perform trusted device management.

Certain other examples involve sending verification requests to the client with new proof data based on one or more risk management criteria.

Still other examples involve determining the proof data on the basis of a content or type of transaction relating to the first access token request.

In particular examples, the authentication service comprises an OAuth protocol authentication service, the client comprises an OAuth protocol configured client, and the secure token refresh method comprises an extension of the OAuth 2.0 protocol.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 2 is a message flow diagram showing a simplified example of an exchange of messages 200 in an application of the disclosed technology for secure refresh of access tokens;

FIG. 7 is a computer architecture diagram illustrating a computing device architecture for a computing device capable of implementing aspects of the techniques and technologies presented herein.

DETAILED DESCRIPTION

Figure 1:
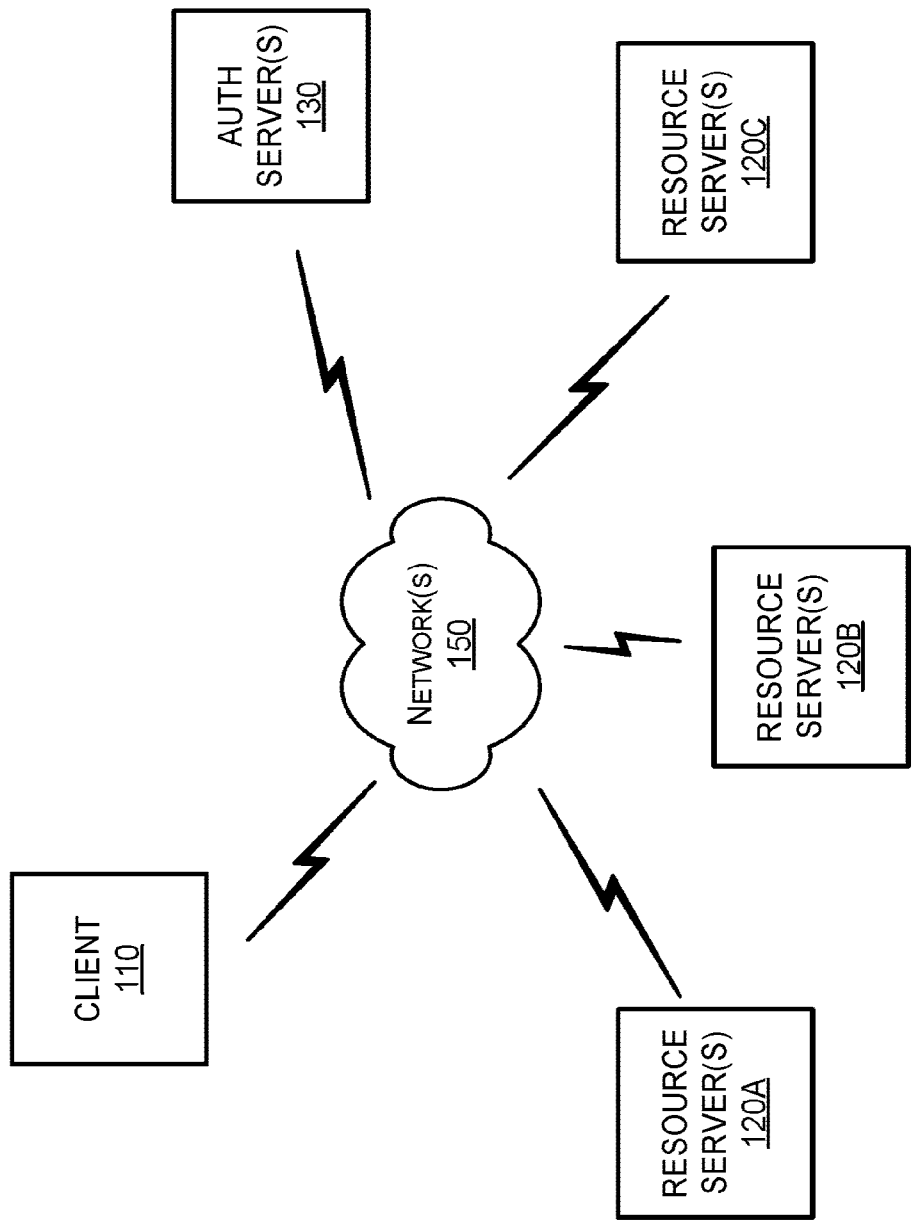
FIG. 1 is an architectural diagram showing an illustrative example of an architecture suitable for application of the disclosed technology for secure refresh of access tokens.

The following Detailed Description describes technologies for refresh of access tokens in an authentication context, such as OAuth. Typically, an access token is required to obtain access to a protected resource. An authentication server is typically utilized to issue and maintain access tokens.

However, access tokens have limited lifetimes. If an application needs access to an API beyond the lifetime of a single access token, then it can obtain a refresh token. A refresh token allows the application to obtain new access tokens. However, it is important that refresh tokens be stored securely by a client application because they permit a user or client application to remain authenticated as long as the refresh token remains valid.

For example, the OAuth 2.0 standard provides for refresh tokens that may be used by a client application to get a new access token issued by the authentication server without having to repeat the authentication process. See the Internet Engineering Task Force (IETF) draft for OAuth 2.0 Token Exchange, https://tools.ietf.org/html/draft-ietf-oauth-token-exchange-16, which proposes the use of refresh tokens to allow an authorization server to maintain authentication of an access token utilized by a user or client.

As noted above, however, refresh tokens can be susceptible to man-in-the-middle attack when a request with a refresh token is sent by a client to an authentication server over an open communication channel in order to obtain a new access token.

Further, refresh tokens act as a shared secret between a client application and the authentication server. Because a refresh token provides access to a resource so long as it remains valid, it is important for both the client application and authentication server to securely store the refresh token. Otherwise, the refresh tokens can be vulnerable to data compromise.

In contrast, the disclosed technology has the advantage of providing a more secure approach for issuing refresh tokens that can provide improved security involving Application Program interfaces (APIs). In general terms, the disclosed technology utilizes asymmetric cryptography, such as public key infrastructure (PM), e.g. Rivest-Shamir-Adleman (RSA) public-key encryption or elliptic curve cryptography (ECC), to securely refresh access tokens.

Still further, because the disclosed technology allows for a server to revoke access by a client, it may also have a technical advantage of improved balancing of workloads—a server can revoke access to a client if there are excessive loads. And in addition, another security technical advantage is that it allows a server to recognize potential bot activity with excessive calls, and cut off client calls in response.

One example of the disclosed technology is directed toward advanced security networking protocol extensions for OAuth 2.0, that provide for refresh tokens relating to access tokens. In this example, during an OAuth 2.0 authentication and authorization process, the authorization server issues an access token to a client or application upon authentication and authorization of a user. As part of the authentication process, the client will generate an asymmetric cryptographic key pair and store the private key securely on the client side. The client will send the public key to the authentication server along with the access token. The server will store the received public key and link it to the access tokens issued to the client.

In order to refresh the access token, in this example, the client will request a refresh token from the authorization server that includes the original or current access token. The authorization server will respond with a verification request message that includes proof data. The client will use the private key for the access token on its side to sign the proof data and create a cryptographic signature. The client will send the cryptographic signature along with original access token in response to the verification request. The authorization server will use the public key associated with the original access token to validate the cryptographic signature based on the proof data. If the authorization server successfully validates the cryptographic signature, then the server will issue a new access token to the client.

The authorization server can readily revoke the refresh capability by revoking or nullifying the public key stored for an access token. Subsequently, a refresh access token request from the client will fail.

In certain examples, the proof data can be selected to correspond to a specific transaction or a type of transaction. In other examples, the authorization server can maintain continuous authentication of a user or client by periodically or occasionally issuing a verification request to the client with proof data for signature to maintain continuous authorization for the user or client.

In still other examples, the authorization server can manage the client as a trusted device by using the verification request to periodically validate the client as a trusted device.

In yet other examples, the authentication server can perform risk management by issuing verification requests to the client based on risk management factors, such as receiving requests from the client from multiple different geolocations, receiving an excessive number of requests from the client, or receiving an authorization request for the same entity, e.g. a client/application/user, different platforms, e.g., a web browser, an Internet of Things (IOT) device, or a smart phone.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for secure refresh of access tokens will be described. As will be described in more detail below with respect to the figures, there are a number of applications and services that may embody the functionality and techniques described herein.

FIG. 1 is an architectural diagram showing an illustrative example of an architecture 100 suitable for application of the disclosed technology for secure refresh of access tokens. In the example of FIG. 1, a client 110, such as a consumer's mobile client device, is a device with an application that can communicate with resource servers 120A-C and authentication server 130 through network 150. Resource servers 120A-C can communicate with one another and authentication server 130 through network 102 to transfer, for example, authentication data and other data relating to access to a resource, such as a database or other resource maintained by resource servers 120A-C. Authentication server 130 is a platform for managing authentication and access tokens relating to access of a user or applications of client 110 to access resource servers 120A-C, such as through an API supported by one of the resources servers 120A-C.

FIG. 2 is a message flow diagram showing a simplified example of an exchange of messages 200 in an application of the disclosed technology for secure refresh of access tokens. In this example, a user or application using client 110 initiates an authentication flow, at 202, to obtain an authentication token from authentication server 130 that permits access to a computer resource, such as a resource supported by one of the resource servers 120, through one or more APIs. At 204, in this example, client 110 sends a request for an access token to authentication server 130.

At 210, if authentication is successful, authentication server 130 sends a first access token Token1 to client 110. In accordance with the disclosed technology, when client 110 receives Token1, it generates a key pair, e.g. a public key pair with complementary public and private key values, and securely stores the private key generated for access token Token1 in association with Token1. At 212, client 110 sends the public key generated for Token1 to authentication server 130, which stores the public key in association with Token1.

The access token Token1 permits access to a protected resource on a resource server 120. At 220, client 110 sends an access request with Token1 to the resource server 120. Resource server 120 validates Token 1 with authentication server 130 by sending a validation request at 222 and receiving a validation response at 224. If validation is successful, then resource server 120, at 226, sends a response to client 110 that includes the resource protected by the access token.

In this example, at 230, client 110 sends a refresh request with access token Token1 to authentication server 130. This may, for example, be a result of Token1 having expired or access to resource server 120 using access token Token1 being rejected. At 232, authentication server 130 responds with a verification request to client 110 that includes proof data and access token Token1. The proof data can take the form of a set of data known to the authentication server 130. The proof data may be related to the substantive functions associated with access token Token1 or resource server 120, e.g. transaction or resource identifier, or may be unrelated random text.

When client 110 receives the verification request at 232, it utilizes the private key associated with access token Token1 to cryptographically sign the proof data. At 234, client 110 sends a verification response with the signed proof data and access token Token1 to authentication server 130. Authentication server 130 utilizes the public key associated with access token Token1 to verify that the signed proof data was signed using the private key held by client 110. If the signed proof data is verified, then, at 236, authentication server 130 sends a response with a new access token Token2. Authentication server 130 stores access token Token2 in association with the public key that was previously provided by client 110.

Subsequent refresh cycles can be similarly performed wherein the public key associated with a current access token is used to verify proof data signed by the client in order to issue a new access token. The disclosed technology is not vulnerable to a man-in-the-middle attack because the private key generated by the client is never shared. The ability to refresh an access token can be readily revoked by deleting or modifying the public key stored in association with the access token, which prevents the authentication server from being able to verify the signed proof data from the client.

Note that while the disclosed technology is suitable for use with an authentication server 130 as an extension of the OAuth authentication protocol, it is to be appreciated that the disclosed technology may be applicable to other authentication processes that utilize a similar refresh token capability.

Figure 3A:
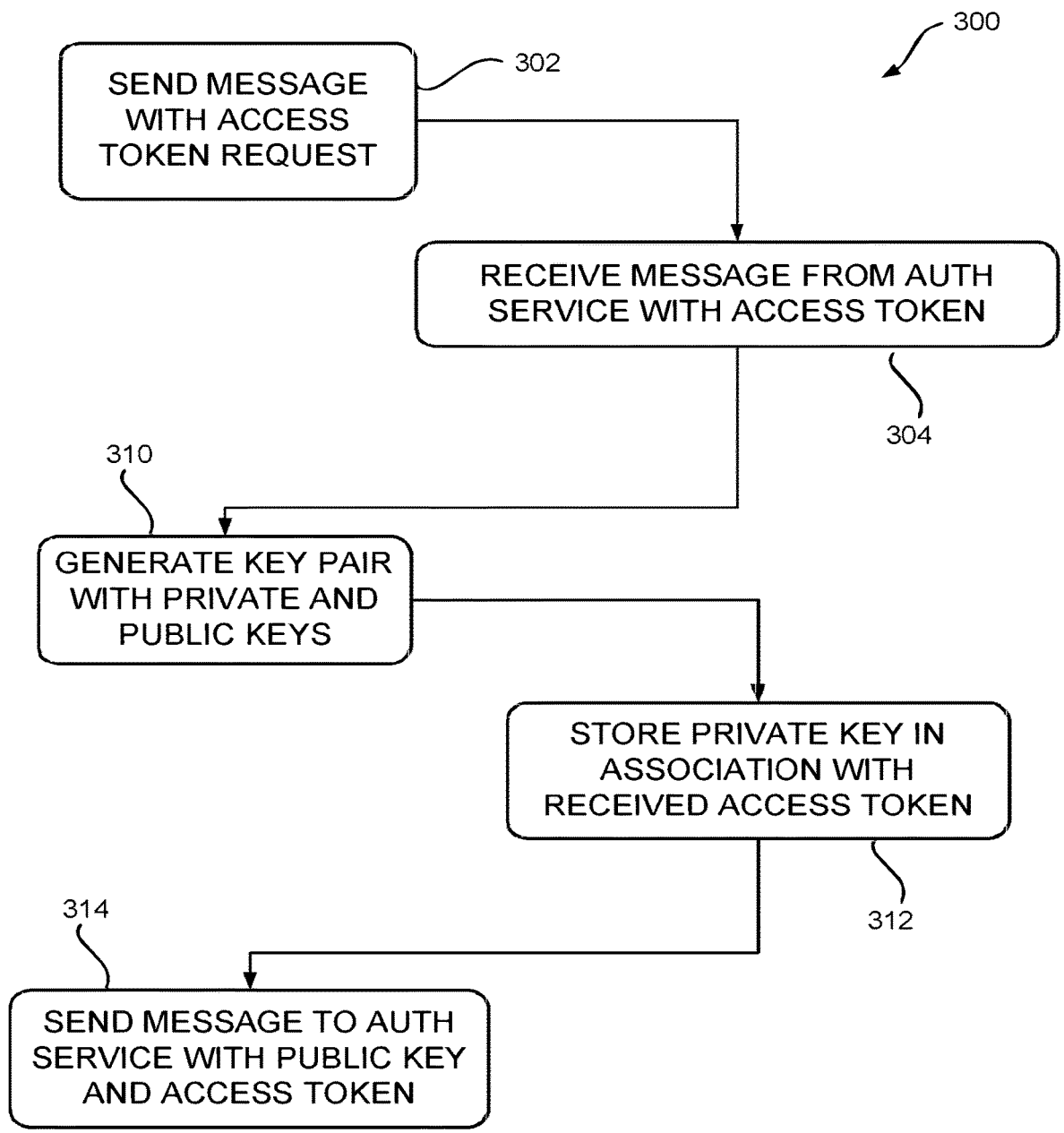
FIG. 3A is a control flow diagram showing an illustrative example of a process for configuring a secure refresh token approach in accordance with the disclosed technology that can execute in an application in a client.

FIG. 3A is a control flow diagram showing an illustrative example of a process 300 for configuring a secure refresh token approach in accordance with the disclosed technology that can execute in an application in a client, such as an application on client 110 in FIG. 1. At 302, the client sends a message with an access token request to an authentication service, such as an authentication service supported on authentication server 130 in FIG. 1.

At 304, if authentication is successful, the client receives a message from the authentication service with an access token. At 310, the client generates an asymmetric key pair, e.g. a pair with private and public keys. At 312, the client securely stores the received access token in association with the private key. At 314, the client sends a message to the authentication service with the public key and the access token.

Figure 3B:
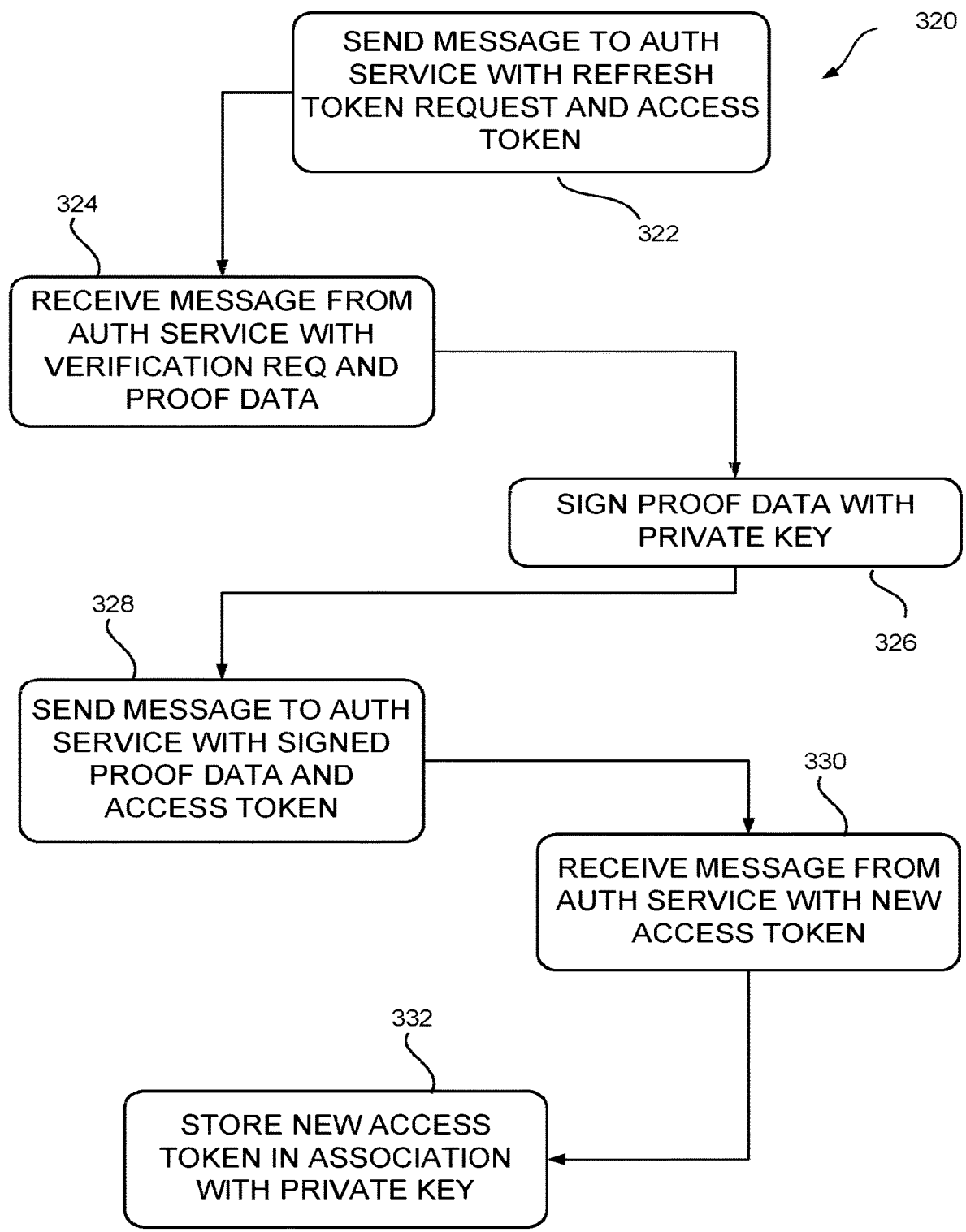
FIG. 3B is a control flow diagram showing an illustrative example of a process 320 for securely requesting a token refresh in accordance with the disclosed technology that can execute in an application in a client.

FIG. 3B is a control flow diagram showing an illustrative example of a process 320 for securely requesting a token refresh in accordance with the disclosed technology that can execute in an application in a client. To initiate a token refresh, the client, at 322, sends a message to the authentication service with a refresh token request and the access token.

At 324, the client receives a message from the authentication service with a verification request and proof data. At 326, the client signs the proof data with the private key generated for the access token. At 328, the client sends a message to the authentication server with the signed proof data and the access token.

At 330, if the verification is successful in the authentication service, the client receives a message from the authentication service with a new access token. At 332, the client stores the new access token in association with the private key.

Note that, in some examples, the message received at 324 can include an access token. In these examples, at 326, the client can utilize the private key associated with the access token to sign the proof data. At 328, in these examples, the access token may be excluded from the message sent to the authorization service. In particular examples, the client may utilize any private key associated with an access token received from the authorization service to sign the proof data at 326 and the authorization service may attempt to verify the signed proof data at 458 with any private key associated with an access token provided to the client.

Figure 4A:
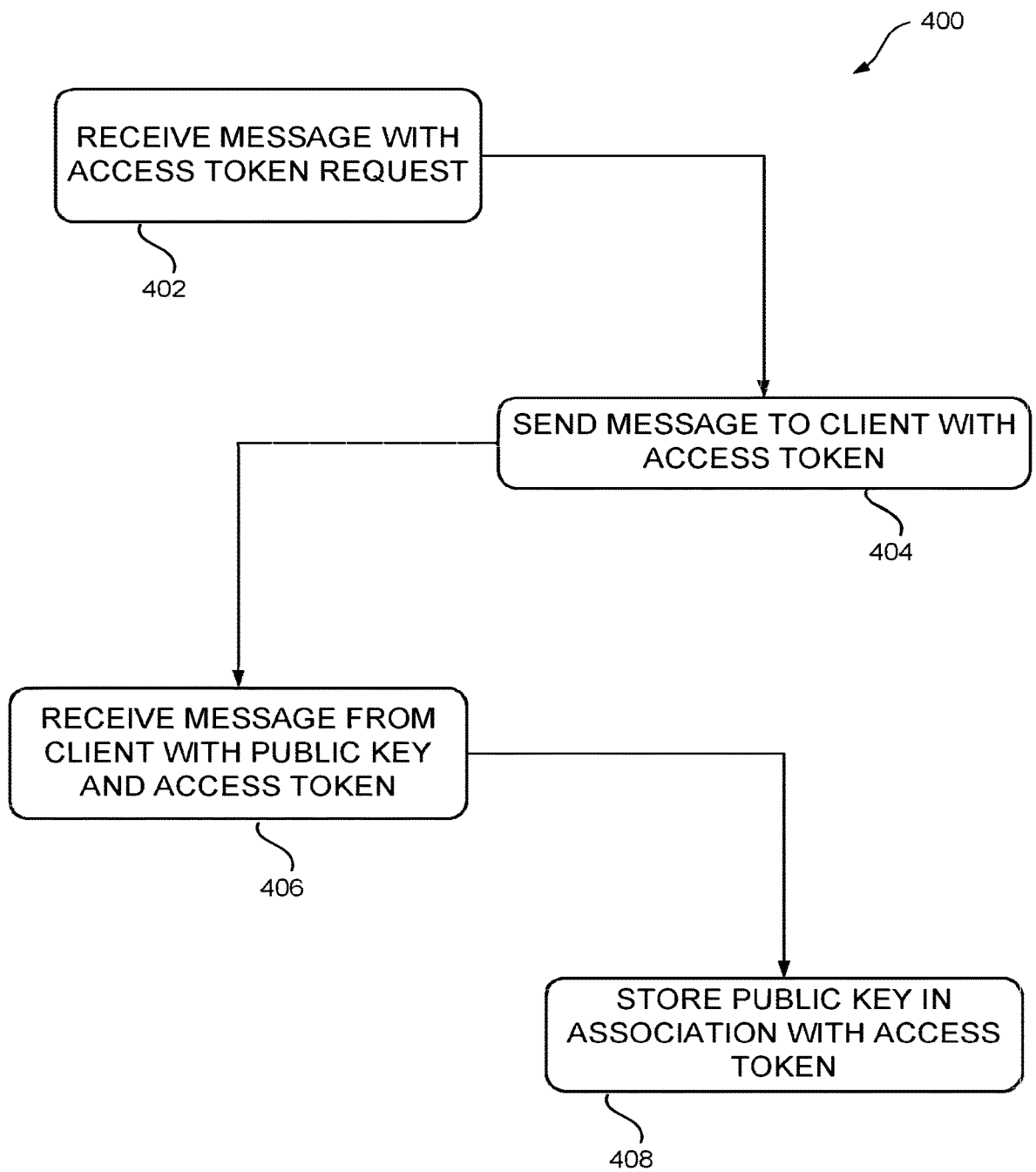
FIG. 4A is a control flow diagram showing an illustrative example of a process for configuring a secure refresh token approach in accordance with the disclosed technology that can execute in an authentication service.
Figure 4B:
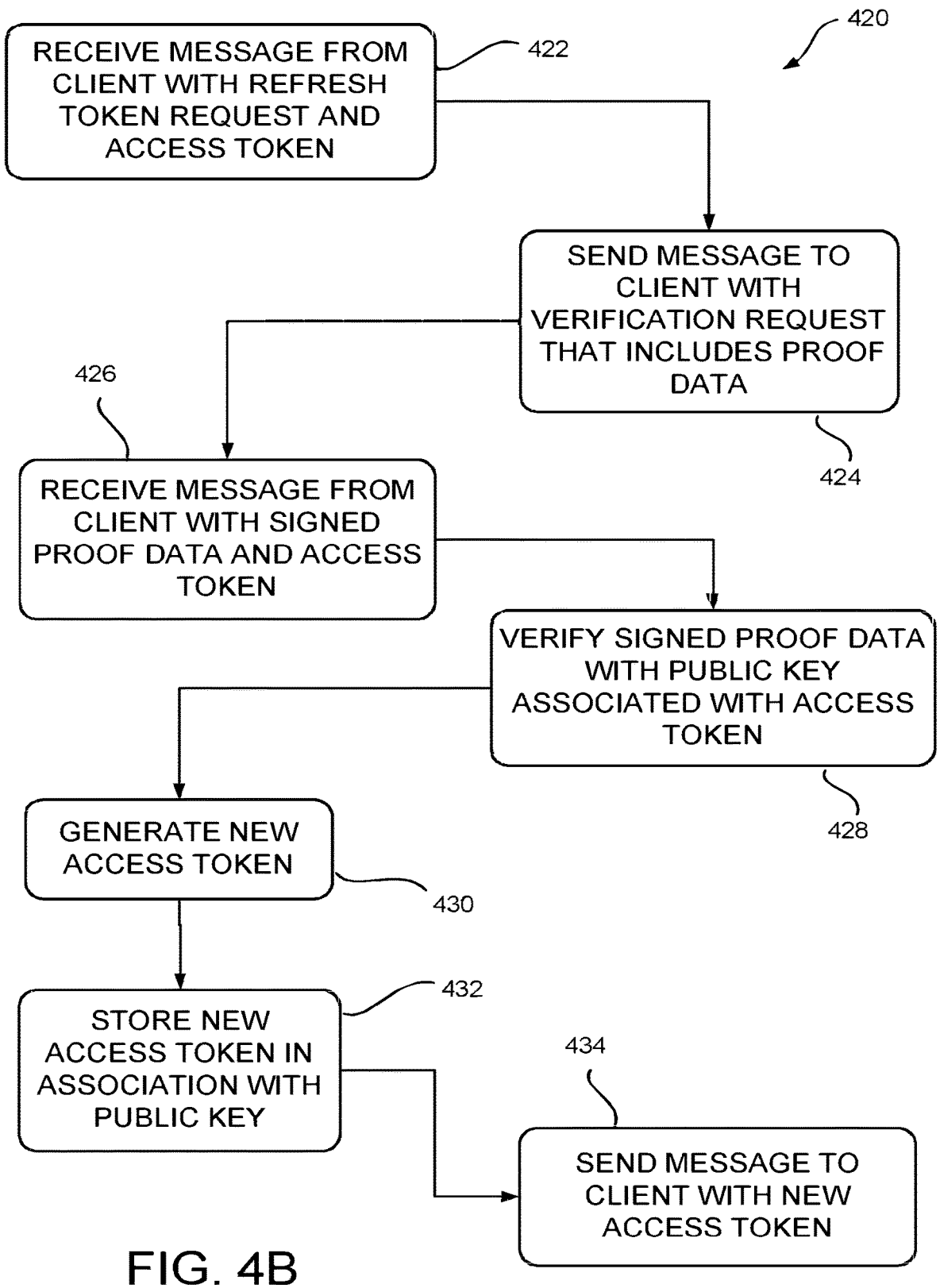
FIG. 4B is a control flow diagram showing an illustrative example of a process for securely refreshing an access token in accordance with the disclosed technology that can execute in an authentication service.
Figure 4C:
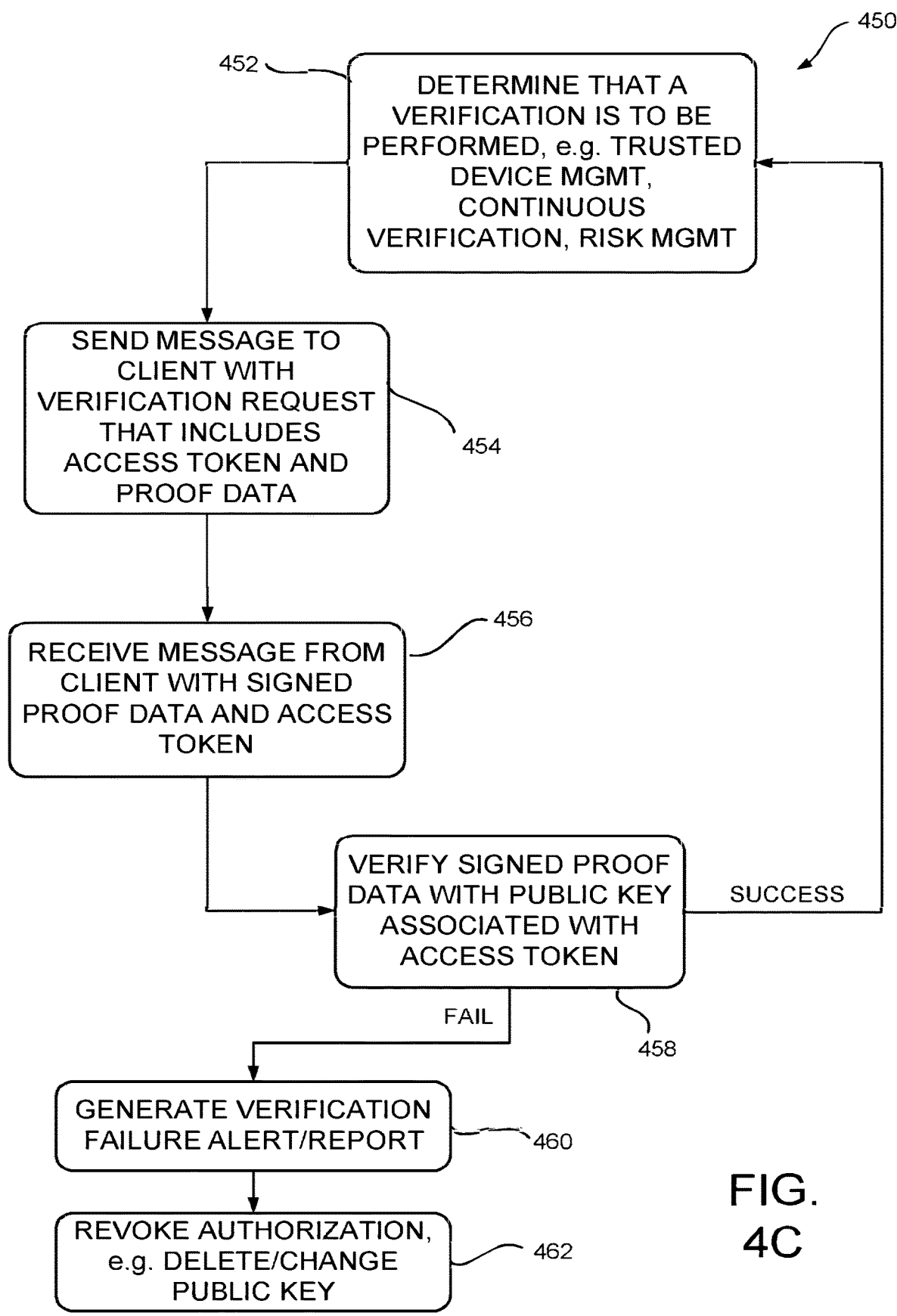
FIG. 4C is a control flow diagram showing an illustrative example of a verification process, such as can be used for trusted device management, continuous verification or risk management, in accordance with the disclosed technology that can execute in an authentication service.

Also note that in certain examples relating to the example of authorization service process of FIG. 4C for verification no associated with refreshing an access token, e.g. trusted device management, continuous verification or risk management, the client may execute just the operations 324, 326 and 328 to provide a response to the verification request without necessarily obtaining a new access token.

FIG. 4A is a control flow diagram showing an illustrative example of a process 400 for configuring a secure refresh token approach in accordance with the disclosed technology that can execute in an authentication service, such as an authentication service in authentication server 130 in FIG. 1. At 402, the authentication service receives a message from a client with an access token request.

The authentication service will validate the request, e.g. by requesting and a user's credentials and validating that the credentials permit access to a protected resource or domain. If validation is successful, the authentication will generate an access token. At 404, the authentication service sends a message to the client with the access token.

At 406, in accordance with one example of the disclosed technology, the authentication service receives a message from the client with a public key generated by the client along with the access token. At 408, the authentication stores the public key in association with the access token.

FIG. 4B is a control flow diagram showing an illustrative example of a process 420 for securely refreshing an access token in accordance with the disclosed technology that can execute in an authentication service. At 422, the authentication service receives a message from the client with a refresh token request along with the access token.

At 424, the authentication service sends a message to the client that with a verification request that includes proof data. At 426, the authentication service receives a message from the client with the signed proof data and the access token. At 428, the authentication service verifies the signed proof data using the public key associated with the access token.

If verification is successful, the authentication service generates a new access token at 430. At 432, the authentication service stores the new access token in association with the public key. At 434, the authentication service sends a message to the client with the new access token.

A subsequent refresh cycle involving process 320 in FIG. 3B and process 420 in FIG. 4B will find the new access token, e.g. Token2, associated with the private key in the client and with the public key in the authentication service. With each successful refresh cycle, another access token is generated and stored in association with the private and public key pair.

FIG. 4C is a control flow diagram showing an illustrative example of a verification process 450, such as can be used for trusted device management, continuous verification or risk management, in accordance with the disclosed technology that can execute in an authentication service.

At 452, a determination is made that a verification is to be performed with respect to an access token, client or device. In some examples, the determination can be based on a time period or schedule, such as may be suitable for trusted device management or continuous verification. In other examples, the determination can be based on risk factors, such as may be used on risk management. Examples of risk factors or criteria that can be utilized in various examples can include requests from a client from multiple different geolocations, platforms (e.g. different browser applications) or devices (e.g. home computer, work computer or mobile device), types of devices (e.g. person computer, mobile device or Internet of Things (IOT) device), activity from historical activity for a client, receiving an excessive number of requests from a client, or receiving an authorization requests for the same entity (e.g. a client/application/user) from different platforms (e.g. operating system, web browser). In other examples, a combination of time or schedule and risk factors can be utilized.

At 454, a message is sent to a client with a verification request that includes an access token for which the client if authorized and proof data. The client, as discussed above with respect to FIG. 3B, will sign the proof data with a private key associated with the access token and send the signed proof data, which is received by the authentication service at 456.

At 458, the authentication service verifies the signed proof data with the public key associated with the access token. If the verification is successful, control, in this example, returns to 452 for determination of the next verification cycle.

If verification fails at 458, then control flows to 460, where a verification failure alert or report is generated indicating the verification failure. At 462, authorization for the access token can be revoked by deleting or changing the public key associated with the access token, e.g. the public token stored in association with the access token at operation 408 of FIG. 4A or operation 432 of FIG. 4B.

Note that in some examples, the verification request at 454 does not include the access token. For example, the client can, at 326, determine an access token associated with the server or the service and use the private key associated with the access token to sign the proof data. At 458, the service can verify the signed proof data using a private key associated with the client.

In certain examples, the service may attempt to verify the signed proof data at 454 using each private key associated with the client, e.g. step through each private key stored in the service for the client, to determine if any one private key is able to verify the signed proof data. Similarly, in such an example, the client, at 326, may utilize any private key associated with the service to sign the proof data.

It should be appreciated that a variety of different instrumentalities and methodologies can be utilized to establish wireless communication as well as collect, exchange and display sensor and message data without departing from the teachings of the disclosed technology. The disclosed technology provides a high degree of flexibility and variation in the configuration of implementations without departing from the teachings of the present disclosure.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach to trust delegation. The specific examples of different aspects of trust delegation described herein are illustrative and are not intended to limit the scope of the techniques shown.

Computer Architectures for Trust Delegation

Figure 6:
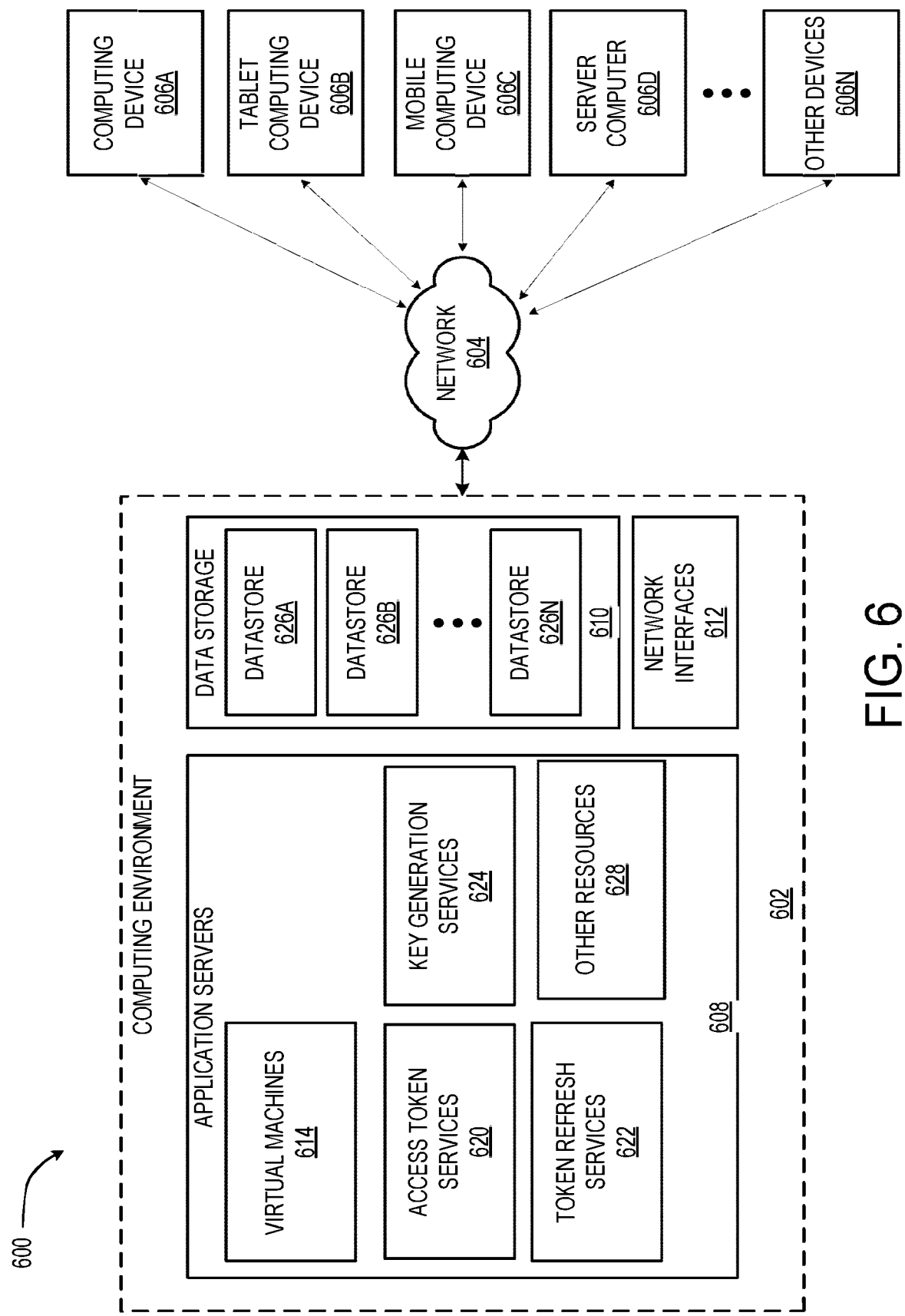
FIG. 6 is a diagram illustrating a distributed computing environment capable of implementing aspects of the techniques and technologies presented herein.

Note that at least parts of processes 300, 320, 400 and 420 of FIGS. 3A, 3B, 4A and 4B and other processes and operations pertaining to trust delegation described herein may be implemented in one or more servers, such as computer environment 600 in FIG. 6, or the cloud, and data defining the results of user control input signals translated or interpreted as discussed herein may be communicated to a user device for display. Alternatively, the authentication service processes may be implemented in a server or in a cloud service. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 300, 320, 400 and 420 of FIGS. 3A, 3B, 4A and 4B) are described herein as being implemented, at least in part, by an application, component, and/or circuit. Although the following illustration refers to the components of FIGS. 3A, 3B, 4A and 4B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 300, 320, 400 and 420 of FIGS. 3A, 3B, 4A and 4B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 5:
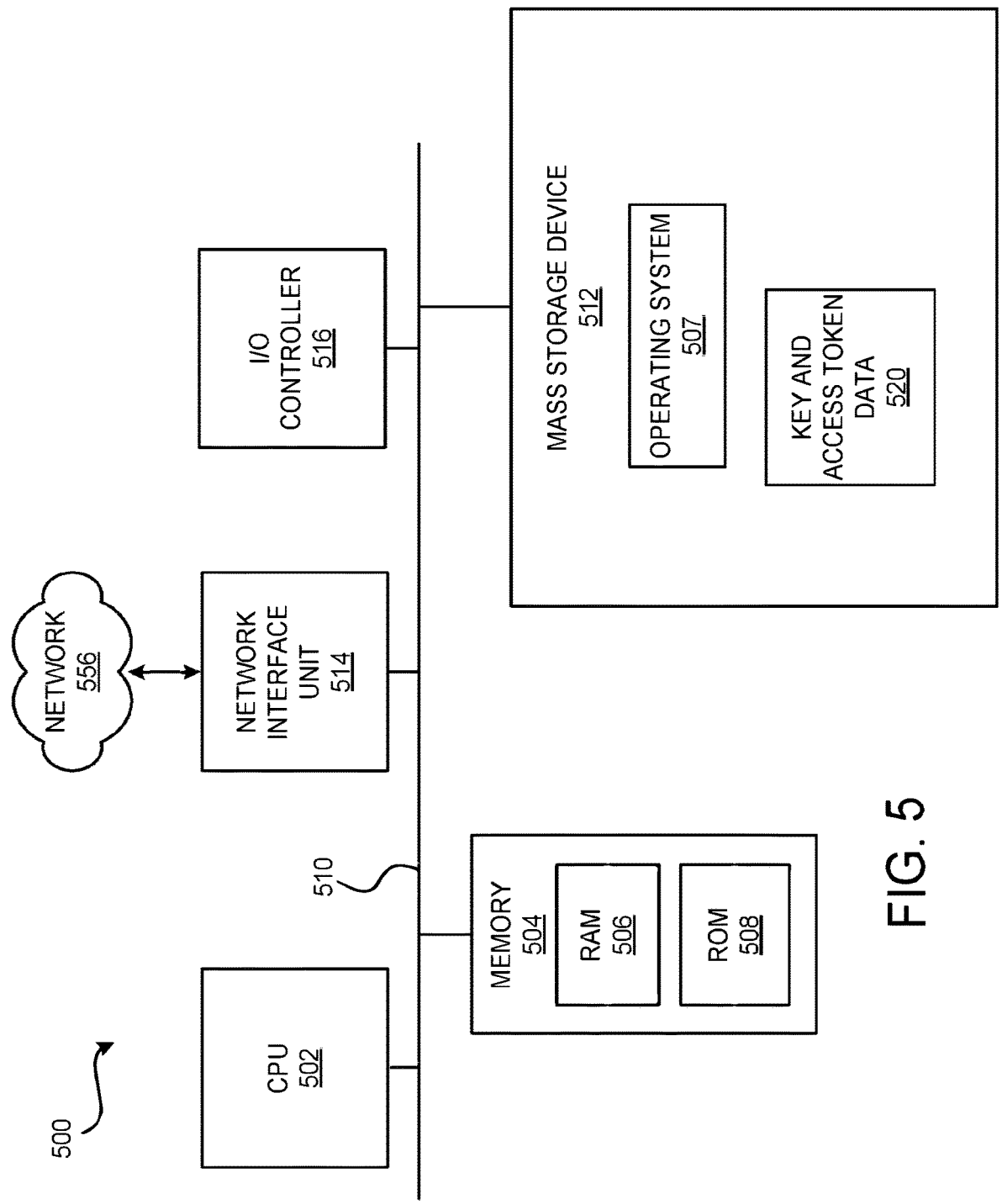
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the devices 110, 120A-C and 130 in FIG. 1, capable of executing the program components described herein. Thus, the computer architecture 500 illustrated in FIG. 5 illustrates an architecture for an on-board vehicle computer, a server computer, mobile phone, a PDA, a smart phone, a desktop computer, a netbook computer, a tablet computer, an on-board computer, a game console, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between sub-elements within the computer architecture 500, such as during startup, is stored in the ROM 508. The computer architecture 500 further includes a mass storage device 512 for storing an operating system 507, data (such as key and access token data 520 where access tokens are stored in association with keys), and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, game controller, television remote or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

FIG. 6 depicts an illustrative distributed computing environment 600 capable of executing the software components described herein for trust delegation. Thus, the distributed computing environment 600 illustrated in FIG. 6 can be utilized to execute many aspects of the software components presented herein. For example, the distributed computing environment 600 can be utilized to execute one or more aspects of the software components described herein.

According to various implementations, the distributed computing environment 600 includes a computing environment 602 operating on, in communication with, or as part of the network 604. The network 604 may be or may include the network 556, described above. The network 604 also can include various access networks. One or more client devices 606A-806N (hereinafter referred to collectively and/or generically as "clients 606") can communicate with the computing environment 602 via the network 604 and/or other connections (not illustrated in FIG. 6). In one illustrated configuration, the clients 606 include a computing device 606A, such as a laptop computer, a desktop computer, or other computing device; a slate or tablet computing device ("tablet computing device") 606B; a mobile computing device 606C such as a mobile telephone, a smart phone, an on-board computer, or other mobile computing device; a server computer 606D; and/or other devices 606N, which can include a hardware security module. It should be understood that any number of devices 606 can communicate with the computing environment 602. Two example computing architectures for the devices 606 are illustrated and described herein with reference to FIGS. 5 and 7. It should be understood that the illustrated devices 606 and computing architectures illustrated and described herein are illustrative only and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for trust delegation. It should be understood that this configuration is illustrative only and should not be construed as being limiting in any way.

According to various implementations, the application servers 608 also include one or more access token services 620, token refresh services 622, and key generation services 624. The access token services 620 can include services for handling authentication requests and issuing access tokens. The token refresh services 622 can include services for handling token refresh processes. The key generation services 624 can include services for managing the generation of key pairs with respect to token refresh.

As shown in FIG. 6, the application servers 608 also can host other services, applications, portals, and/or other resources ("other resources") 628. The other resources 628 can include, but are not limited to, data encryption, data sharing, or any other functionality.

As mentioned above, the computing environment 602 can include data storage 610. According to various implementations, the functionality of the data storage 610 is provided by one or more databases or data stores operating on, or in communication with, the network 604. The functionality of the data storage 610 also can be provided by one or more server computers configured to host data for the computing environment 602. The data storage 610 can include, host, or provide one or more real or virtual data stores 626A-826N (hereinafter referred to collectively and/or generically as "datastores 626"). The datastores 626 are configured to host data used or created by the application servers 608 and/or other data. Aspects of the datastores 626 may be associated with services for a trust delegation. Although not illustrated in FIG. 6, the datastores 626 also can host or store web page documents, word documents, presentation documents, data structures, algorithms for execution by a recommendation engine, and/or other data utilized by any application program or another module.

The computing environment 602 can communicate with, or be accessed by, the network interfaces 612. The network interfaces 612 can include various types of network hardware and software for supporting communications between two or more computing devices including, but not limited to, mobile client vehicles, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 may provide the software functionality described herein as a service to the clients using devices 606. It should be understood that the devices 606 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 600 to utilize the functionality described herein for trust delegation, among other aspects.

Turning now to FIG. 7, an illustrative computing device architecture 700 for a computing device that is capable of executing various software components is described herein for trust delegation. The computing device architecture 700 is applicable to computing devices such as mobile clients in vehicles. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 700 is applicable to the client device 110, resource servers 120A-C and authentication server 130 shown in FIG. 1 and computing devices 606A-N shown in FIG. 6.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, secure data.

In some configurations, the processor 702 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, California and others. In some configurations, the processor 702 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Washington or AWS from Amazon Corporation of Seattle, Washington. The operating system may also include WINDOWS MOBILE OS from Microsoft Corporation of Redmond, Washington, WINDOWS PHONE OS from Microsoft Corporation, WINDOWS from Microsoft Corporation, MAC OS or IOS from Apple Inc. of Cupertino, California, and ANDROID OS from Google Inc. of Mountain View, California Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 756 of FIG. 7. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or be adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 602.11 standards, such as IEEE 602.11a, 602.11b, 602.11g, 602.11n, and/or future 602.11 standard (referred to herein collectively as WI-FI). Draft 602.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interfaces described below or may include processing functionality built-in to the processor 702.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The power components 712 may also include a power connector, which may be combined with one or more of the aforementioned I/O components 710. The power components 712 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described.

Rather, the specific features and acts are disclosed as example forms of implementing the claimed subject matter.

The present disclosure is made in light of the following clauses:

Clause 1. A computer-implemented secure token refresh method, the method comprising: by an authentication service, receiving a first message from a client with a first access token request and, in response, sending a message that includes a first access token to the client; by the authentication service, receiving a second message that includes the first access token and a public key value; and in response to receiving the second message, storing the public key value in association with the first access token.

Clause 2. The secure token refresh method of Clause 1, the method including: by the authentication service, receiving a third message from the client with a refresh token request and the first access token and, in response, sending a reply message with a verification request to the client that includes first proof data; by the authentication service, receiving a fourth message from the client with first signed proof data, where the first signed proof data was generated by the client signing the first proof data using a private key corresponding to the public key and the first access token and, in response: verifying the first signed proof data with the public key stored in association with the first access token, generating a second access token, storing the second access token in association with the public key, and sending a fifth message to the client with the second access token.

Clause 3. The method of Clause 2, the method including: by the authorization service, periodically sending verification requests to the client with new proof data to maintain continuous authentication or perform trusted device management.

Clause 4. The method of Clause 2, the method including: by the authorization service, sending verification requests to the client with new proof data based on one or more risk management criteria.

Clause 5. The method of Clause 2, the method including: by the authorization service, determining the proof data on the basis of a content or type of transaction relating to the first access token request.

Clause 6. The method of Clause 2, wherein: the authentication service comprises an OAuth protocol authentication service; and the authentication service comprises an OAuth protocol authentication service; and the secure token refresh method comprises an extension of the OAuth 2.0 protocol.

Clause 7. The method of Clause 2, the method including: in the authentication service, determining that a verification is to be performed; sending a sixth message to the client with a verification request that includes the first access token and second proof data; receiving a seventh message from the client with second signed proof data, where the second signed proof data was generated by the client signing the second proof data using the private key corresponding to the public key and the first access token and, in response: verifying the second signed proof data with the public key stored in association with the first access token, if the verifying the second signed proof data fails, performing one of: generating a verification failure alert or report, and revoking authorization of the first access token.

Clause 8. A system for secure token refresh, the system comprising: one or more processors; and one or more memory devices in communication with the one or more processors, the memory devices having computer-readable instructions stored thereupon that, when executed by the processors, cause the processors to perform a method for secure token refresh, the method comprising: by an authentication service, receiving a first message from a client with a first access token request and, in response, sending a message that includes a first access token to the client; by the authentication service, receiving a second message that includes the first access token and a public key value; and in response to receiving the second message, storing the public key value in association with the first access token.

Clause 9. The system of Clause 8, where the secure token refresh method includes: by the authentication service, receiving a third message from the client with a refresh token request and the first access token and, in response, sending a reply message with a verification request to the client that includes first proof data; by the authentication service, receiving a fourth message from the client with first signed proof data, where the first signed proof data was generated by the client signing the first proof data using a private key corresponding to the public key and the first access token and, in response: verifying the first signed proof data with the public key stored in association with the first access token, generating a second access token, storing the second access token in association with the public key, and sending a fifth message to the client with the second access token.

Clause 10. The system of Clause 9, where the secure token refresh method includes: by the authorization service, periodically sending verification requests to the client with new proof data to maintain continuous authentication or perform trusted device management.

Clause 11. The system of Clause 9, where the secure token refresh method includes: by the authorization service, sending verification requests to the client with new proof data based on one or more risk management criteria.

Clause 12. The system of Clause 9, where the secure token refresh method includes: by the authorization service, determining the proof data on the basis of a content or type of transaction relating to the first access token request.

Clause 13. The system of Clause 9, wherein: the authentication service comprises an OAuth protocol authentication service; and the secure token refresh method comprises an extension of the OAuth 2.0 protocol.

Clause 14. The system of Clause 9, where the secure token refresh method includes: in the authentication service, determining that a verification is to be performed; sending a sixth message to the client with a verification request that includes the first access token and second proof data; receiving a seventh message from the client with second signed proof data, where the second signed proof data was generated by the client signing the second proof data using the private key corresponding to the public key and the first access token and, in response: verifying the second signed proof data with the public key stored in association with the first access token, if the verifying the second signed proof data fails, performing one of: generating a verification failure alert or report, and revoking authorization of the first access token.

Clause 15. One or more computer storage media having computer executable instructions stored thereon which, when executed by one or more processors, cause the processors to execute a secure token refresh method, the method comprising: by an authentication service, receiving a first message from a client with a first access token request and, in response, sending a message that includes a first access token to the client; by the authentication service, receiving a second message that includes the first access token and a public key value; and in response to receiving the second message, storing the public key value in association with the first access token.

Clause 16. The computer storage media of Clause 15, where the secure token refresh method includes: by the authentication service, receiving a third message from the client with a refresh token request and the first access token and, in response, sending a reply message with a verification request to the client that includes first proof data; by the authentication service, receiving a fourth message from the client with first signed proof data, where the first signed proof data was generated by the client signing the first proof data using a private key corresponding to the public key and the first access token and, in response: verifying the first signed proof data with the public key stored in association with the first access token, generating a second access token, storing the second access token in association with the public key, and sending a fifth message to the client with the second access token.

Clause 17. The computer storage media of Clause 16, where the secure token refresh method includes: by the authorization service, periodically sending verification requests to the client with new proof data to maintain continuous authentication or perform trusted device management.

Clause 18. The computer storage media of Clause 16, where the secure token refresh method includes: by the authorization service, sending verification requests to the client with new proof data based on one or more risk management criteria.

Clause 19. The computer storage media of Clause 16, where the secure token refresh method includes: by the authorization service, determining the proof data on the basis of a content or type of transaction relating to the first access token request.

Clause 20. The computer storage media of Clause 16, where the secure token refresh method includes: in the authentication service, determining that a verification is to be performed; sending a sixth message to the client with a verification request that includes the first access token and second proof data; receiving a seventh message from the client with second signed proof data, where the second signed proof data was generated by the client signing the second proof data using the private key corresponding to the public key and the first access token and, in response: receiving a seventh message from the client with second signed proof data, where the second signed proof data was generated by the client signing the second proof data using the private key corresponding to the public key and the first access token and, in response: verifying the second signed proof data with the public key stored in association with the first access token, if the verifying the second signed proof data fails, performing one of: generating a verification failure alert or report, and revoking authorization of the first access token.

What is claimed is:

1. A computer-implemented method comprising:
generating, at a client device, a key pair having a private key and a public key;
sending the public key to an authentication service;
receiving proof data from the authentication service;
signing the proof data using the private key to provide signed proof data;
sending the signed proof data to the authentication service that verifies the signed proof data using the public key; and
receiving an access token from the authentication service in response to the authentication service verifying the signed proof data.

2. The computer-implemented method of claim 1, the method further comprising:
sending a first access token request to the authentication service; and
in response to the first access token request, receiving a first access token from the authentication service.

3. The computer-implemented method of claim 2, wherein sending the public key to the authentication service comprises sending a message that includes the first access token and the public key.

4. The computer-implemented method of claim 3, wherein sending the message with the first access token and the public key to the authentication service causes the authentication service to store the public key in association with the first access token.

5. The computer-implemented method of claim 1, the method further comprising:
sending a refresh token request to the authentication service, wherein the proof data is provided by the authentication service in response to the refresh token request.

6. The computer-implemented method of claim 5, wherein the refresh token request includes the first access token.

7. The computer-implemented method of claim 1, the method further comprising:
receiving, from the authentication service, a verification request with new proof data based on one or more risk management criteria.

8. One or more computer storage media storing computer-useable instructions that, when used by one or more computing devices, cause the one or more computing devices to perform operations comprising:
generating, at a client device, a key pair having a private key and a public key;
sending the public key to an authentication service;
receiving proof data from the authentication service;
signing the proof data using the private key to provide signed proof data;
sending the signed proof data to the authentication service that verifies the signed proof data using the public key; and
receiving an access token from the authentication service in response to the authentication service verifying the signed proof data.

9. The one or more computer storage media of claim 8, the operations further comprising:
sending a first access token request to the authentication service; and
in response to the first access token request, receiving a first access token from the authentication service.

10. The one or more computer storage media of claim 9, wherein sending the public key to the authentication service comprises sending a message that includes the first access token and the public key.

11. The one or more computer storage media of claim 10, wherein sending the message with the first access token and the public key to the authentication service causes the authentication service to store the public key in association with the first access token.

12. The one or more computer storage media of claim 8, the operations further comprising:
sending a refresh token request to the authentication service, wherein the proof data is provided by the authentication service in response to the refresh token request.

13. The one or more computer storage media of claim 12, wherein the refresh token request includes the first access token.

14. The one or more computer storage media of claim 8, the operations further comprising:
receiving, from the authentication service, a verification request with new proof data based on one or more risk management criteria.

15. A system comprising:
one or more processors; and
one or more computer storage media storing computer-useable instructions that, when used by the one or more processors, cause the one or more processors to perform operations comprising:
generating, at a client device, a key pair having a private key and a public key;
sending the public key to an authentication service;
receiving proof data from the authentication service;
signing the proof data using the private key to provide signed proof data;
sending the signed proof data to the authentication service that verifies the signed proof data using the public key; and
receiving an access token from the authentication service in response to the authentication service verifying the signed proof data.

16. The system of claim 15, the operations further comprising:
sending a first access token request to the authentication service; and
in response to the first access token request, receiving a first access token from the authentication service.

17. The system of claim 16, wherein sending the public key to the authentication service comprises sending a message that includes the first access token and the public key.

18. The system of claim 17, wherein sending the message with the first access token and the public key to the authentication service causes the authentication service to store the public key in association with the first access token.

19. The system of claim 15, the operations further comprising:
sending a refresh token request to the authentication service, wherein the proof data is provided by the authentication service in response to the refresh token request.

20. The system of claim 19, wherein the refresh token request includes the first access token.

\* \* \* \* \*